Sept. 29, 1931. C. A. FRENCH ET AL 1,824,988
WATER LEVEL INDICATOR APPARATUS FOR STEAM POWER PLANTS
Filed Jan. 12, 1925
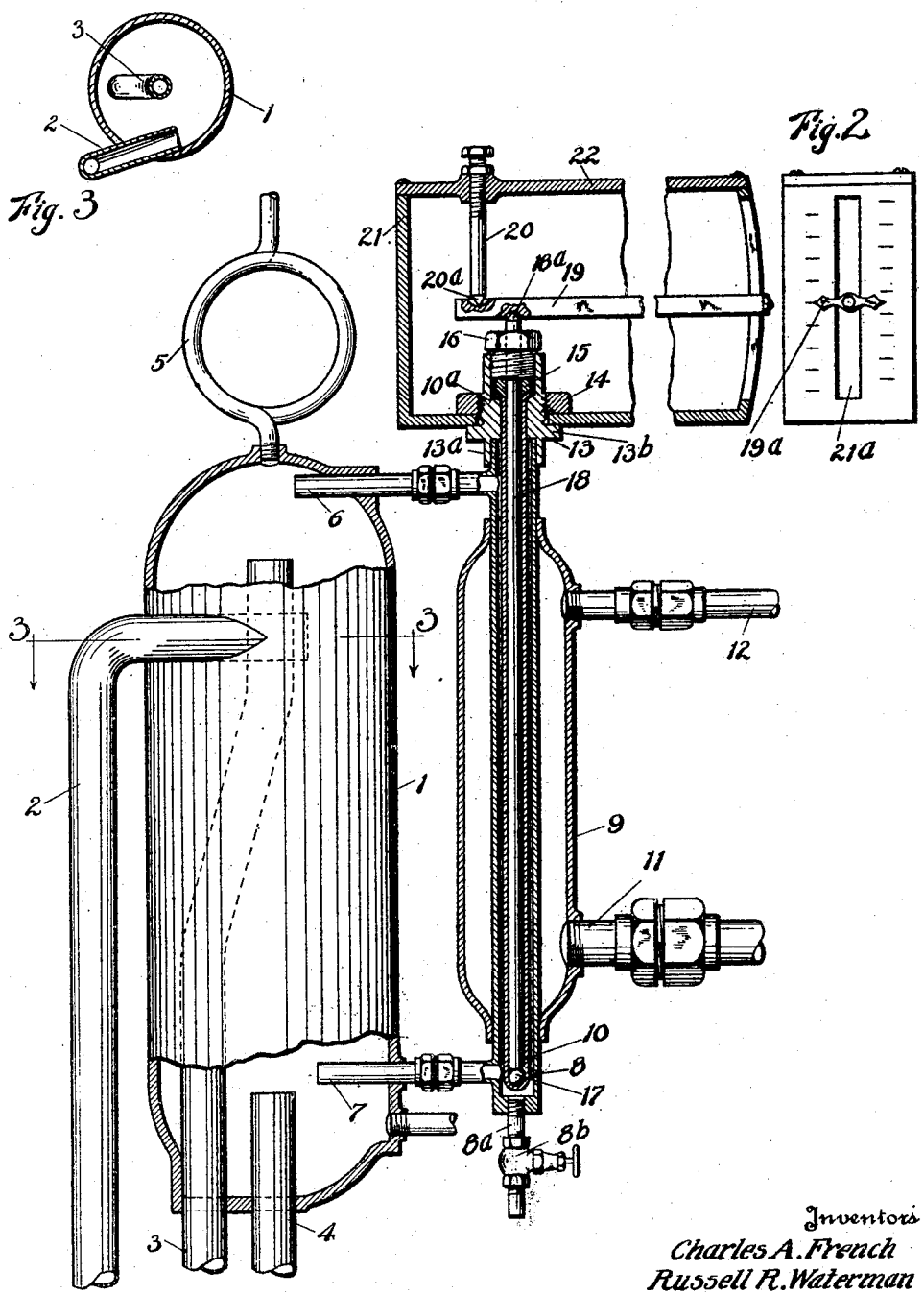
Inventors
Charles A. French
Russell R. Waterman
By A. B. Bowman
Attorney Patented Sept. 29, 1931

1,824,988

UNITED STATES PATENT OFFICE

CHARLES A. FRENCH AND RUSSELL R. WATERMAN, OF LONG BEACH, CALIFORNIA, ASSIGNORS TO FARMERS' NATIONAL BANK OF GREENVILLE, OHIO, TRUSTEE, OF GREENVILLE, OHIO, A CORPORATION OF OHIO

WATER LEVEL INDICATOR APPARATUS FOR STEAM POWER PLANTS

Application filed January 12, 1925. Serial No. 1,855.

Our invention relates to a water level indicator apparatus for steam power plants and more particularly adapted for and used in connection with the automotive steam power plant set forth in our application for Letters Patent in the United States Patent Office for automotive steam power plants filed November 26, 1924, Serial No. 752,399, and the principal object of this invention is to provide a water level indicator apparatus of this class which will indicate the water level positively and accurately in automotive steam power plants. Another object of the invention is to provide an apparatus of this class in connection with a constant supply reservoir and one portion of which communicates with a constant feed water pump, the other with a primary boiler coil, and the indicator indicates the water level in the constant supply tank containing both steam and water. Another object of the invention is to provide a novel apparatus of this class to be used in connection with automotive steam power plants. Another object of the invention is to provide an apparatus of this class which is very simple and economical of construction, efficient, durable, automatic in its action and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a partial sectional and elevational, diagrammatic view of our apparatus. Fig. 2 is an end view of the indicator member and Fig. 3 is a sectional view through 3—3 of Fig. 1 on a reduced scale.

Similar characters of reference refer to similar parts and portions throughout the several views of the drawings. The steam storage and separating drum 1, tangential conductor 2, conductors 3, and 4, gage conductor 5, conductors 6 and 7, water column member 8, feed water jacket 9, copper expansion tube 10, feed water conductor from pump 11, primary boiler water conductor 12, bushing member 13, nut 14, clamp member 15, plug 16, ball 17, rod 18, lever 19, adjusting screw 20, casing 21, and cover member 22, constitute the principal parts and portions of our water level indicator apparatus. The steam storage and separating drum 1 is provided with a conductor 2 which connects with said drum at a tangent as shown best in Figs. 1 and 3 of the drawings so that the steam and the water from the boiler through the conductor 2 enters the drum at a tangent separating the steam from the water by centrifugal force and throwing all bodies heavier than water against the outside wall of the drum. Therefore, the conductors 6 and 7 are set in nearly to the center of the drum 1 to prevent scale, foreign materials and other solids from entering the conductors 6 and 7. These conductors 6 and 7 are secured in the wall of the drum and support and communicate with the water column 8 at its upper and lower ends. To the upper end of the drum extends a conductor 3 which is connected with the superheater coil of the boiler, not shown, while the conductor 4 communicating with the lower end of the drum, is connected with the evaporator coil of the boiler. It is understood, however, that the drum may be connected to the boiler in any other manner desired. This water column 8 is provided at its lower end with an outlet conductor 8a which is provided with a valve 8b which is adapted to clean the water column. This water column 8 is surrounded by a feed water jacket 9 through which cold feed water is pumped more or less continuously from a constant feed pump (not shown) through the conductor 11 into the feed water jacket 9 and out through the conductor 12 to the primary coil of the boiler. Extending through the active working length of the water column 8 is a copper expansion tube 10 which is closed at the bottom as shown best in Fig. 1 and provided with a flange 10a at its upper end. In the bottom of this copper tube 10 is a steel ball 17 upon which rests a cast iron rod 18. The ball 17 permits even distribution of force, exerted by the rod, over the whole inner end of the tube, and also transfers all tendency of wear on the ball itself. Secured on the upper end of the water column 8 is a bushing 13 which is provided with downwardly extending flange 13a which fits over the upper end of the water column 8 forming a water tight joint at the upper end. This bushing 13 is provided with an outwardly extending flange 13b which extends outwardly and is adapted to engage the walls of the casing 21. This bushing is provided externally with threads upon which is mounted the nut 14 which rests against the inside wall of the casing 21, thereby clamping the bushing 13 relatively to the casing 21. This bushing 13 is provided with a central hole therethrough which is enlarged at its upper end, the enlarged portion terminating at its lower end in a downwardly beveled shoulder or seat. Through the lower portion of the hole extends the upper end of the copper expansion tube 10 which fits snugly therein and is provided at its upper end with an enlarged or flanged portion 10a which fits against said seat. Against the upper flanged end of the expansion tube 10 and around the rod 18 is positioned a clamp ring 15 which is clamped against said flanged portion 10a by a plug 16 which is screwed into the enlarged portion of the hole of the bushing 13 from the upper end thereof. The upper end of the rod 18 extends out through the plug 16 and is provided with a pointed end 18a.

The casing 21 is preferably an elongated rectangular shaped casing provided with a cover 22 secured thereon. Mounted in this cover 22 is an adjusting screw 20 which extends downwardly into the casing in a position adjacent to the upper end of the rod 18. The extended end of this adjusting screw 20 is pointed at 20a. Mounted on the point 18a which serves as a fulcrum is a lever 19; the one end of said lever engages the point 20a of the adjusting screw 20. The other end of said lever extends outwardly through a slot 21a in the one end of the casing 21 and mounted on the extended end of this lever is a hand or index finger 19a, and the end of the member 21 adjacent to the index finger is provided with a scale on opposite sides for indicating the water level.

The operation of the apparatus is as follows:

The water in the water column 8 is not in circulation but the height thereof is retained at approximately the level of the water in the drum 1, and is kept at nearly feed water temperature by the cooling effect of the feed water jacket 9, while the steam in the water column is at the temperature corresponding to the temperature of the steam under boiler pressure. Under full load conditions the feed water temperature is usually about 195 to 200 degrees Fahrenheit while the steam in the water column which is under a boiler pressure of 750 lbs. has a temperature of 519 degrees Fahrenheit, it being noted that a portion of the column extends above the water jacket 9 and is therefore not directly subjected to the cooling effect of the cooling water therein. Thus there is a difference of approximately 319 to 324 degrees between the temperature of the water and that of the steam. As the water goes down in the drum 1, more of the length of the copper tube is exposed to the steam temperature thus expanding it and causing the top end of the cast iron rod to bear less heavily against the indicating lever 19 by reason of the expansion of the copper tube which is greater than the expansion of the cast iron rod, causing the outer end to lower; and as the water level in the drum rises the reverse action takes place causing the lever to rise or to be shifted in the opposite direction. Although specific temperatures and boiler pressures are set forth herein, these are only by way of illustration. Our apparatus functions equally as well under other temperatures and pressures when constructed or calibrated for such other temperatures and pressures, it being noted that for the proper functioning of our apparatus the temperature of the water in the column 8 and the boiler pressure are to remain substantially constant.

Though we have shown and described a particular construction, combination and arrangement of parts and portions, we do not wish to be limited to this particular construction, combination and arrangement but desire to include in the scope of our invention the construction, combination and arrangement substantially as set forth in the appended claims.

Having thus described our invention what we claim as new and desire to secure by Letters Patent is:

1. In a water level indicator apparatus for steam power plants, a steam and water drum, a hollow vertical column member communicating with said drum near its upper and lower ends, a copper expansion tube closed at its lower end and mounted in said hollow vertical column member and supported near its upper end on the upper end of said column member, a steel ball positioned in the bottom of said tube, a rod positioned in said tube on said ball, means for rigidly connecting said column member with said expansion tube, a circulating water jacket surrounding said column member, a lever pivotally mounted upon the extended end of said rod, an adjusting screw engaging the one end of said lever, and scale means contiguous to the opposite end of said lever.

2. In a water level indicator apparatus for steam power plants, a steam and water drum, a hollow vertical column member communicating with said drum near its upper and lower ends, a copper expansion tube closed at its lower end and mounted in said hollow vertical column member and supported near its upper end on the upper end of said column member, a steel ball positioned in the bottom of said tube, a rod positioned in said tube on said ball, means for rigidly connecting said column member with said expansion tube, a circulating water jacket surrounding said column member, a lever pivotally mounted upon the extended end of said rod, an adjusting screw engaging the one end of said lever, scale means contiguous to the opposite end of said lever, and steam and water supply means in communication with said steam and water drum.

3. In a water level indicator apparatus for steam power plants, the combination with a boiler, of a water column member communicating at its upper and lower ends therewith and adapted to receive steam and water therefrom, a water circulating chamber adjacent to the outer wall of said member, heat expansion means mounted in said member, the water and steam therein impinging against the expansion means, a portion of the expansion means being fixed relative to said member and another portion thereof being freely movable relative to the member when the expansion means is subjected to said water and steam, indicating means, and means operatively connecting said indicating means to the movable portion of said expansion means, said expansion means, when expanded by the steam, actuating said indicating means.

4. In a water level indicator apparatus for steam power plants, the combination with a boiler, of a water column member communicating at its upper and lower ends therewith and adapted to receive steam and water therefrom, a water circulating chamber adjacent to the outer wall of said member, elongated heat expansion means mounted in and extending substantially the full length of said member, and adapted to be subjected simultaneously to the temperature of the steam and water therein, one end of the expansion means being fixed relative to said member and the other end being freely movable relative thereto, indicating means, and means operatively connecting said indicating means to the movable end of said expansion means, said expansion means, when expanded by the steam, actuating said indicating means.

5. In a water level indicator apparatus for steam power plants, the combination with a boiler, of a supporting means in association with the boiler, an elongated expansion tube fixed at one end on the supporting means and adapted to be subjected to the water and steam of the boiler, a rod mounted in said tube and extending with one end to the end of the tube opposite the fixed end thereof, the other end of the rod extending beyond the fixed end of the tube, an indicating means, and means operatively connecting said indicating means with the latter end of the rod.

6. In a water level indicator apparatus for steam power plants, a combined steam and water drum, a water column member communicating with the upper and lower ends of said drum, a cold water circulation receptacle surrounding said water column member, an expansion means mounted in said water column member and secured to and extending from one end thereof and adapted to be expanded by the steam therein in inverse proportion to the height of the water therein.

7. In a water level indicator apparatus for steam power plants, a combined steam and water drum, a water column member communicating with the upper and lower ends of said drum, a cold water circulation receptacle surrounding said water column, an elongated expansion member mounted fixedly at its upper end in said water column member and extending therein, means in connection with the inner end of the expansion member and extending from the upper end thereof, indicating means, and means in connection with the portion of said means extending above the upper end of the expansion member operatively connecting the expansion member to said indicating means.

8. In a water level indicator apparatus, a constant supply steam and water drum, a water column member communicating with said drum at its upper and lower ends, elongated expansion means fixed near one end to one end of the water column member and extending substantially the full length of said water column member and having a portion thereof extending from the end of the column member to which the expansion means is fixed, said expansion means being adapted to be expanded by the steam in the water column member in inverse proportion to the height of the water therein, and indicating means operated by the extended end of said expansion means.

9. In a water level indicator apparatus, a constant supply steam and water drum, a water column member communicating with said drum at its upper and lower ends, elongated expansion means fixed near one end to one end of the water column member and extending substantially the full length of said water column member and having a portion thereof extending from the end of the column member to which the expansion means is fixed, said expansion means being adapted to be expanded by the steam in the water column member in inverse proportion to the height of the water therein, indicating means operated by the extended end of said expansion means, and a circulation water jacket surrounding said water column member.

10. In a water level indicator apparatus, a constant supply steam and water drum, a water column member communicating with said drum at its upper and lower ends, elongated expansion means fixed near one end to one end of the water column member and extending substantially the full length of said water column member and having a portion thereof extending from the end of the column member to which the expansion means is fixed, said expansion means being adapted to be expanded by the steam in the water column member in inverse proportion to the height of the water therein, and indicating means operated by the extended end of said expansion means, said indicating means comprising a lever means pivotally mounted on said expansion means, an adjusting member in connection with one end of said lever means, and a scale contiguous to the opposite end thereof.

In testimony whereof, we have hereunto set our hands at Los Angeles, California this 31st day of December 1924.

CHARLES A. FRENCH.
RUSSELL R. WATERMAN.